United States Patent [19]

Wolkersdorfer et al.

[11] Patent Number: 5,071,094

[45] Date of Patent: Dec. 10, 1991

[54] LEAD-THROUGH ARRANGEMENT FOR LINES, PARTICULARLY HOSE PIPES AND/OR DUCTS TO BE LED THROUGH A SUPPORTING WALL IN A VEHICLE

[75] Inventors: Werner Wolkersdorfer, Rutesheim; Ulrich Messner, Korntal, both of Fed. Rep. of Germany

[73] Assignee: Dr. Ing. h.c.F. Porsche AG, Fed. Rep. of Germany

[21] Appl. No.: 659,696

[22] Filed: Feb. 25, 1991

[30] Foreign Application Priority Data

Feb. 26, 1990 [DE] Fed. Rep. of Germany ....... 4005978

[51] Int. Cl.⁵ .............................................. F16H 5/00
[52] U.S. Cl. ................................ 248/56; 174/153 G; 248/68.1
[58] Field of Search .................... 248/56, 27.1, 222.1, 248/68.1; 174/153 G, 65 G, 152 G; 285/162, 158, 159; 16/108; 439/449

[56] References Cited

U.S. PATENT DOCUMENTS

| | | | |
|---|---|---|---|
| 1,094,990 | 4/1914 | Havens | 174/152 G |
| 2,694,798 | 11/1954 | Cole | 174/153 G X |
| 2,922,836 | 1/1960 | Brown | 174/153 G |
| 3,229,026 | 1/1966 | Sulzer | 174/153 G X |
| 3,634,608 | 1/1972 | Buhl | 174/153 G |
| 4,618,113 | 10/1986 | Reimer | 248/68.1 |
| 4,638,964 | 1/1987 | Sovacool | 16/2 |
| 4,640,478 | 2/1987 | Monstevens | 248/27.1 |
| 4,763,541 | 8/1988 | Spease | 248/56 X |
| 4,960,252 | 10/1990 | Binder | 174/153 G |

FOREIGN PATENT DOCUMENTS 3524278 7/1985 Fed. Rep. of Germany.

Primary Examiner—J. Franklin Foss
Attorney, Agent, or Firm—Evenson, Wands, Edwards, Lenahan & McKeown

[57] ABSTRACT

For the lead-through of lines to be led through a supporting wall, a closing body is provided which has receiving sections and which can be inserted into a wall opening by means of lateral guiding elements and can be fixed in it by means of a holding member. So that a lead-through arrangement of this type can also be used for wall openings which are closed on the circumference side, it is provided that at least the legs of the lateral guiding elements of the closing body which—viewed in the inserting direction—face the supporting wall, and the corresponding edge portions of the wall opening are provided with one profile respectively formed by projecting areas and recesses situated between them. The two profiles of the closing body and the wall opening interact with one another in such a manner that, on the one hand, an inserting of the closing body is achieved from the direction of the side and, on the other hand, a locking of the closing body on the supporting wall is achieved by a shifting motion of the closing body.

14 Claims, 5 Drawing Sheets 5,071,094

LEAD-THROUGH ARRANGEMENT FOR LINES, PARTICULARLY HOSE PIPES AND/OR DUCTS TO BE LED THROUGH A SUPPORTING WALL IN A VEHICLE

BACKGROUND AND SUMMARY OF THE INVENTION

The invention relates to a lead-through arrangement for lines, particularly hose pipes and/or ducts to be led through a supporting wall, comprising a closing body which has at least one receiving section for the sealed leading-through of a line, which closing body can be inserted into a wall opening by means of lateral guiding elements and can be fixed in it by means of a holding member, each lateral guiding element having a guide groove formed by two legs which extend at a distance with respect to one another and which rest on the edge portion of the wall opening and reach in sections over the edge portion.

A lead-through arrangement of this type is known from the German Patent Document DE-OS 35 24 278. It is a disadvantage of this arrangement that this type of a line lead-through or of the fastening of the closing body on the supporting wall can be used only in the case of open-edge wall openings.

It is an object of the invention to improve a lead-through arrangement of the initially mentioned type in such a manner that it can also be used for wall openings which are closed on the circumference side so that, on the one hand, a secure fastening of the closing body on the supporting wall is achieved and, on the other hand, the closing body can be mounted rapidly and without any additional tools.

According to the invention, this object is achieved by providing a arrangement wherein at least the legs of the lateral guiding elements of the closing body which face the supporting wall viewed in the inserting direction and the corresponding edge portions of the wall opening are provided with one profile respectively which is formed by projecting areas and recesses situated between them, the profiles of the closing body and the wall opening interacting in such a manner that, on the one hand, an inserting can be achieved of the closing body from the direction of the inserting direction side and, on the other hand, a locking can be achieved of the closing body on the supporting wall.

The principal advantages achieved by the invention are that, by means of the profiles arranged on the closing body and on the wall opening, on the one hand, a simple mounting of the closing body and, on the other hand, a secure fastening of the closing body on the supporting wall is achieved. By means of the profiles, the closing body can also be used when wall openings are closed on the circumference side. By means of the molded-on bendable brackets which interact with an edge of the wall opening, the closing body is held securely in its installed position.

Other objects, advantages and novel features of the present invention will become apparent from the following detailed description of the invention when considered in conjunction with the accompanying drawings.

DETAILED DESCRIPTION OF THE DRAWINGS

Figure 1:
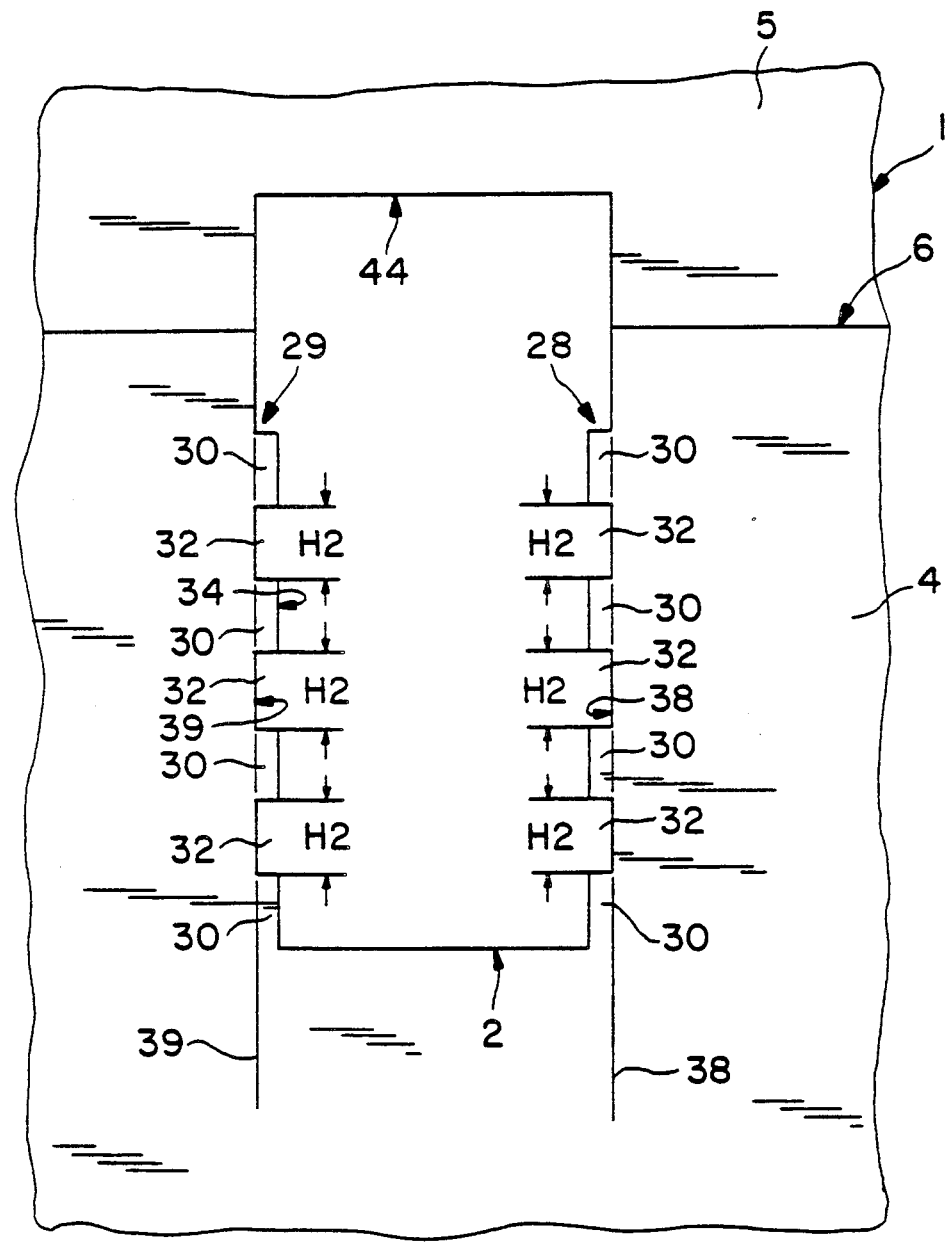
FIG. 1 is a partial frontal view of a supporting wall of a vehicle having a wall opening of a configuration contemplated by the present invention.

FIG. 1 illustrates a supporting wall 1 of a vehicle which is made of plastic or sheet metal and may take up any possible position in space. In the embodiment, the supporting wall 1 is formed by an approximately upright, transversely extending injection-molded or end wall of a motor vehicle.

On the supporting wall 1, a wall opening 2 is provided which is closed on the circumference side and through which, for example, two lines 3, 3a are guided which are arranged at a distance above one another.

The oblong wall opening 2 has an approximately rectangular basic shape, the longer sides extending in the vertical direction and the shorter sides extending in the transverse direction of the vehicle. However, the wall opening 2 may also have a square shape, the shape of a parallelogram or a similar shape, according to other contemplated embodiments. The supporting wall may be constructed to have a plane surface in the area of the wall opening 2 and in the adjacent area.

Figure 4:
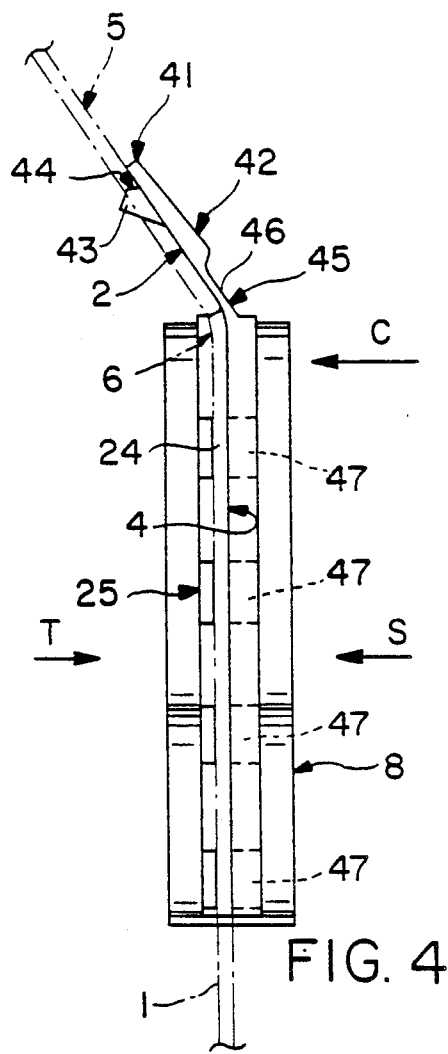
FIG. 4 is a lateral view of the closing body and the supporting wall.

According to FIG. 4, a significant part of the vertical course of the wall opening 2 extends in the area of an approximately perpendicularly extending surface section 4, whereas the remaining part of the wall opening 2 is provided in the adjacent, diagonally extending surface section 5. The two surface sections 4, 5 are connected with one another by way of a radius-shaped transition area 6 (FIG. 4).

Figure 8:
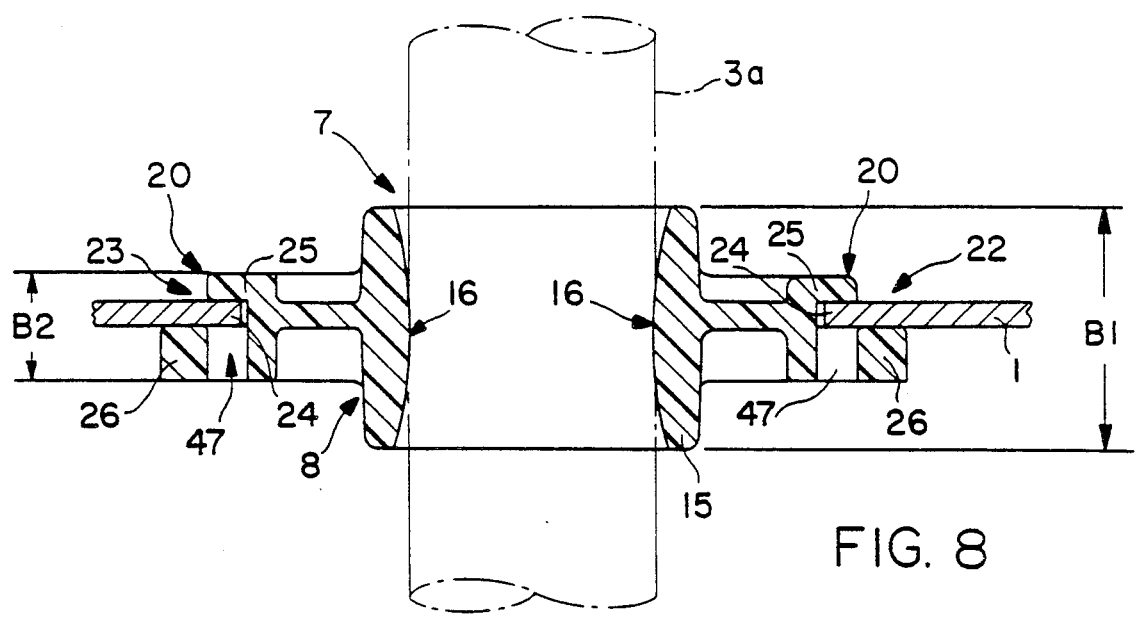
FIG. 8 is an enlarged sectional view taken along Line VIII—VIII FIG. 3.

A lead-through 7 for lines 3, 3a to be guided through the supporting wall 1, particularly hose pipes and/or ducts, comprises an approximately plate-shaped closing body 8 which is adapted to the shape of the wall opening 2 and is held in position on the supporting wall 1 without any additional fastening elements (FIG. 8).

Figure 5:
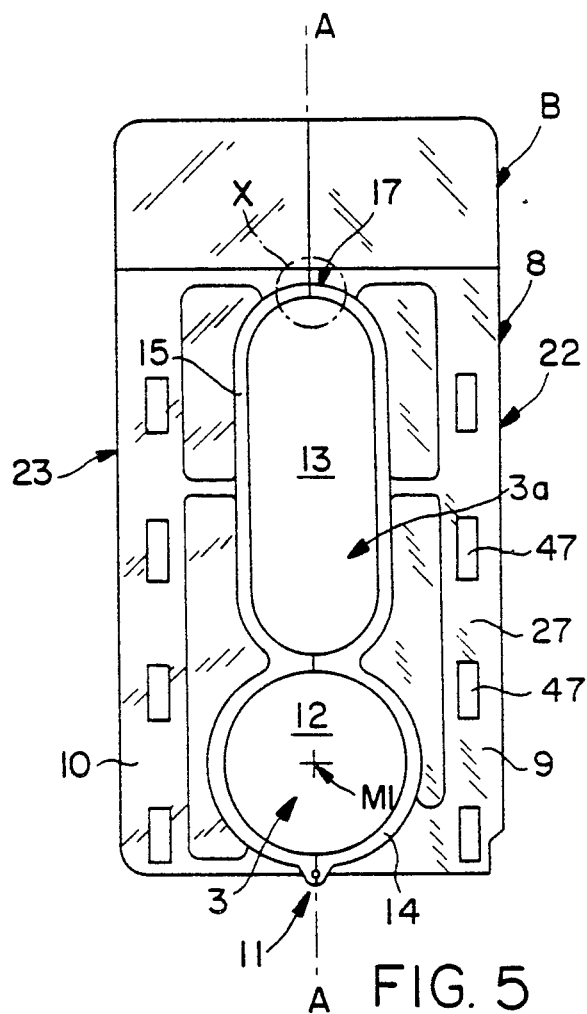
FIG. 5 is a view of the closing body in the direction of the arrow S of FIG. 4.

The closing body 8, which is made of plastic, rubber or the like, comprises two halves 9, 10 which can be folded together and which, at one of their ends, are connected with one another by way of a film joint hinge 11 (FIG. 5).

In addition, receiving sections 12, 13 for the lines 3, 3a to be guided through are provided on the closing body 8 and are disposed above one another (FIG. 5). Receiving section 12 arranged adjacent to the film joint hinge 11 has a circular shape, the center point M1 of the circle being situated on a joint parting plane A—A of the two halves 9, 10. The receiving section 13 disposed above has the shape of an oblong slot opening.

The construction and number of receiving sections 12, 13 depends on the lines to be guided through the supporting wall 1.

In the folded-together installed position B of the two halves 9, 10 of the closing body 8, collar-type webs 14, 15 extend on the circumference side around the two receiving sections 12, 13 and are aligned approximately perpendicularly to the supporting wall 1 (FIG. 5). The webs 14, 15 have a larger width B1 than the width B2 of the plate-shaped area of the closing body (FIG. 8). The webs 14, 15 project over the supporting wall 1 toward both sides. The collar-type webs 14, 15 rest closely, that is, under little prestress, against the exterior side of the guided-through lines 3, 3a so that a sealing takes place between the closing body 8 and the lines 3, 3a.

Figure 7:
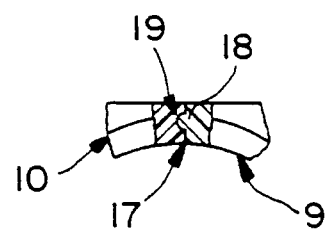
FIG. 7 is an enlarged detail X of FIG. 5.

The cross-sectional view, the surface 16 of the webs 14, 15 resting against the line 3, 3a has a crowned shape (FIG. 8). Adjacent to the upper end area of the web 15, a centering device 17 is provided between the halves 9, 10 (FIG. 5). The centering device comprises a molded-on part 18 on one half 9, the molded-on part 18 projecting into a receiving device 19 of the other half 10 in the installed position B of the closing body 8 (FIG. 7). In the embodiment, the molded-on part 18 and the receiving device 19 have a triangular design in the cross-sectional view.

The closing body 8 can be pushed into the wall opening 2 by means of lateral guiding elements 20 and can be fixed in the wall opening 2 by means of a holding member 21.

The lateral guiding elements 20 are preferably developed on the two upright extending circumferential areas 22, 23 of the closing body 8 and each have a guide groove 24 which is formed by two legs 25, 26 arranged at a distance from one another (FIG. 8). The two legs 25, 26, on opposite sides, rest against the edge portion of the wall opening 2 and reach around the edge portion in sections. The leg 26, which is formed by a continuous upright tilted-out part 27, reaches around the edge portion of the wall opening 2 to a greater extend than the opposite shorter leg 25. The clear space between the two legs 25, 26 is slightly larger than the thickness of the supporting wall 1.

In order to permit a easy inserting of the closing body 8 into the wall opening 2 from one side of the supporting wall 1, at least the legs 25 of the lateral guiding elements 20 of the closing body 8 which are closer to the supporting wall 1 in the inserting direction C, and the corresponding edge portions 28, 29 of the wall opening 2 are provided with a profile 34, 35 which is formed by projecting areas 30, 31 and recesses 32, 33 situated between them.

Figure 9:
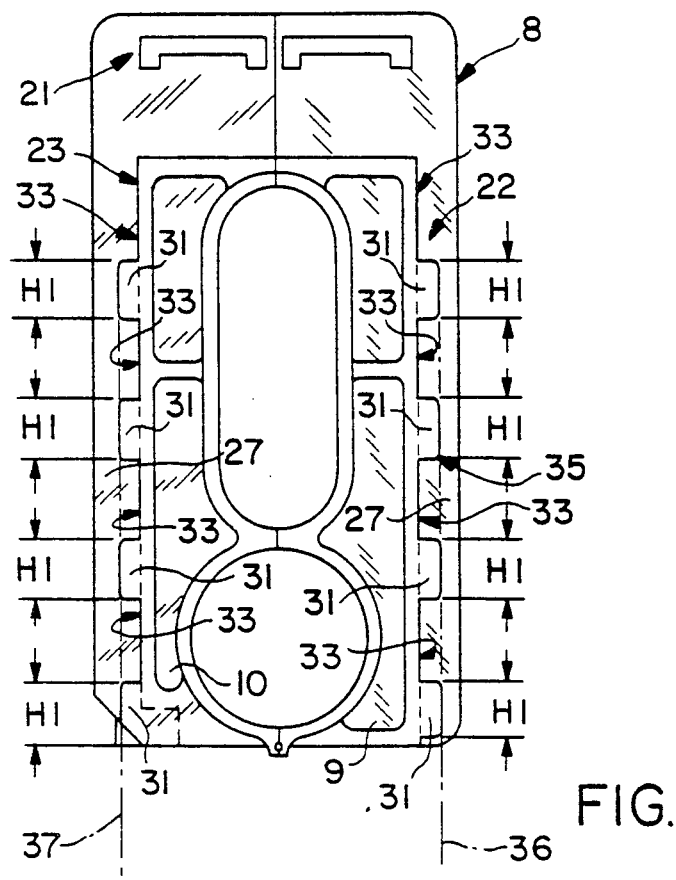
FIG. 9 is a view of the closing body in the direction of arrow I of FIG. 4.

According to FIG. 1, several projecting areas 30 situated above one another are provided at both longitudinal sides 28, 29 of the wall opening 2, one recess respectively 32 extending between two adjacent projecting areas 30. The projecting areas 30 and the recesses 32, corresponding to FIG. 1, are designed to be approximately rectangular. The recesses 33 assigned to the closing body 8 and the projecting areas 31 have a corresponding shape (FIG. 9). However, the possibility exists that the recesses 32, 33 and the projecting areas 30, 31 have a square, triangular, semicircular or similar design.

Figure 2:
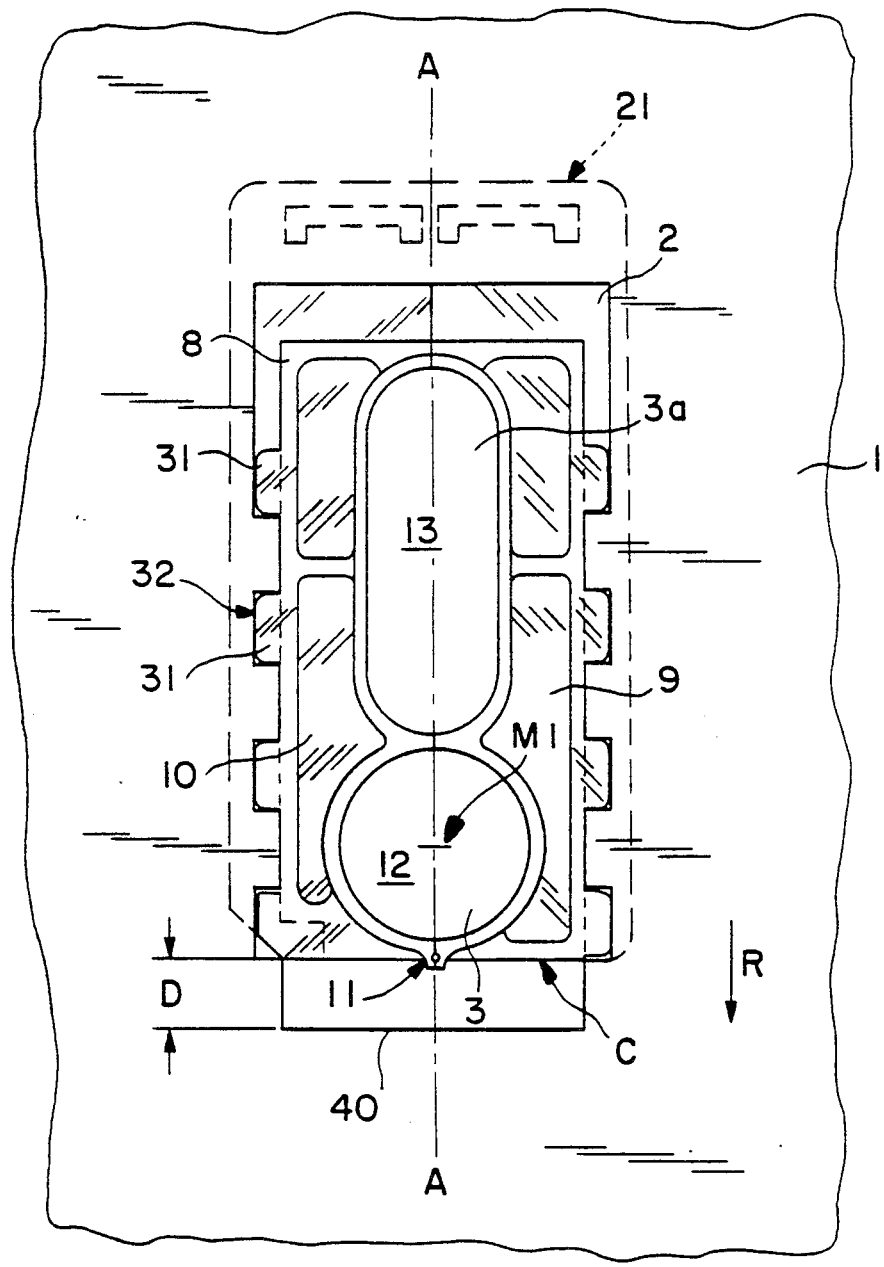
FIG. 2 is a view corresponding to FIG. 1 with a closing body constructed according to a preferred embodiment of the invention inserted into the wall opening in the introducing position.

A lateral inserting of the closing body 8 into the wall opening 2 of the supporting wall 1 becomes possible because of the fact that the projecting areas 31 of the closing body 8, which interact with the recesses 32 of the wall opening 2, have a lower height H1 than the height H2 of the recesses of the wall opening 2. Also, viewed in the transverse direction, a small clear space (gap) is provided between the exterior edges 36, 37 of the projecting areas 31 and the base 38, 39 of the recess 32. In the inserting position C, the closing body 8 extends at a distance D with respect to the lower boundary edge 40 of the wall opening 2 (FIG. 2). In this case, the projecting areas 31 of the closing body are in alignment with the recesses 32 of the wall opening 2.

Figure 3:
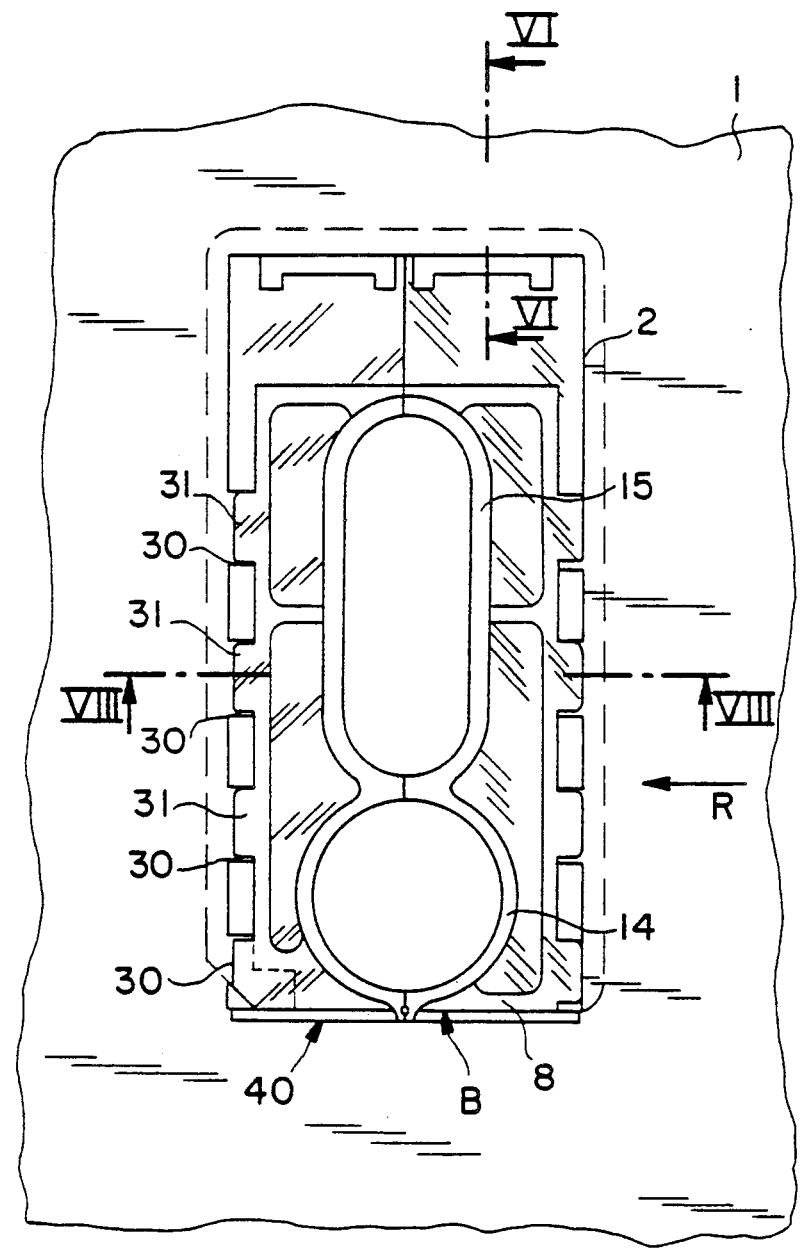
FIG. 3 is a view corresponding to FIGS. 1 and 2 with the closing body inserted into the wall opening in the installed position.

By the shifting of the closing body 8 in the direction of the arrow R by the extent "D", the closing body 8 is locked on the supporting wall 1, this position being shown in FIG. 3 and being characterized as the installed position B. In this case, the closing body 8 supports itself on the lower boundary edge 40 of the wall opening 2, and the lateral projecting areas 31 of the closing body 8 reach behind the projecting areas of the wall opening 2.

For the additional fixing of the closing body 8 in the wall opening 2, holding members 21 are provided on the side of the closing body 8 facing away from the film joint hinges 11 and are formed by molded-on bendable brackets 42.

Figure 6:
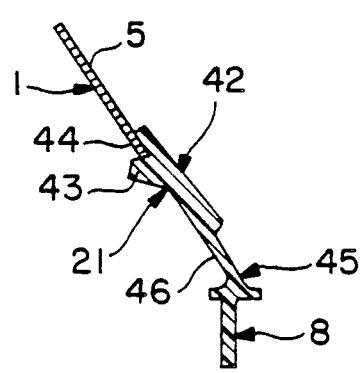
FIG. 6 is an enlarged sectional view taken along Line VI—VI of FIG. 3.

These bendable brackets 42 are prestressed with respect to the supporting wall 1 and, in the area of their free end, have molded-on detents 43 which reach behind an upper edge 44 of the wall opening 2 (FIG. 6).

The mobility of the brackets 42 is achieved by the fact that the brackets 42 have a reduced cross-section 46 above the plate-shaped area at reference number 45 which acts as a hinge.

For reasons of manufacturing, the legs 26 may locally be provided with breakthroughs 47 which, according to FIG. 5 and 8, are arranged to be approximately congruent with the projecting areas 31 of the closing body 8.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A lead-through arrangement for lines, particularly hose pipes and/or ducts, to be led through a supporting wall, comprising a closing body which has at least one receiving section for the sealed leading-through of a line, which closing body can be inserted into a wall opening having an upper edge by means of lateral guiding elements and can be fixed in it by means of a holding member, each lateral guiding element having a guide groove formed by two legs which extend at a distance with respect to one another and which rest on the edge portion of the wall opening and reach in sections over the edge portion, wherein at least the legs of the lateral guiding elements of the closing body which face the supporting wall viewed in the inserting direction, and the corresponding edge portions of the wall opening are provided with one profile respectively which is formed by projecting areas and recesses situated between them, the profiles of the closing body and the wall opening interacting in such a manner that an inserting can be achieved of the closing body from the direction of the inserting direction side and a locking can be achieved of the closing body on the supporting wall by a shifting movement of the closing body in its inserted position;
wherein said holding member includes at least one molded on bendable bracket having a free end and including a detent near said free end which extends behind said upper edge.

2. A lead-through arrangement according to claim 1, wherein the recesses and the projecting areas of the closing body and of the wall opening have an approximately rectangular design.

3. A lead-through arrangement according to claim 1, wherein the projecting areas of the closing body have a lower height than the height of the corresponding recesses on the wall opening.

4. A lead-through arrangement according to claim 3, wherein the projecting areas of the closing body interact with the projecting area of the wall opening in the installed position.

5. A lead-through arrangement according to claim 1, wherein the two halves of the closing body, on the side facing away from a film joint hinge, interact by way of a centering device.

6. A lead-through arrangement according to claim 5, wherein the centering device is provided adjacent to a common parting plane and is formed by a molded-on part arranged on the half which engages with a receiving part of the other half.

7. A lead-through arrangement according to claim 1, wherein the holding members are provided on both halves of the closing body.

8. A lead-through arrangement according to claim 1, wherein the closing body is formed of plastic, rubber or the like.

9. A lead-through arrangement according to claim 1, wherein the supporting wall is a sheet metal wall of a motor vehicle.

10. A lead-through arrangement according to claim 8, wherein the supporting wall is a sheet metal wall of a motor vehicle.

11. A lead-through arrangement according to claim 1, wherein the supporting wall is an injection molded plastic wall of a motor vehicle.

12. A lead-through arrangement according to claim 8, wherein the supporting wall is an injection molded plastic wall of a motor vehicle.

13. A lead-through arrangement according to claim 1, wherein said supporting body involves two differently shaped receiving sections for the sealed leading through of separate lines.

14. A lead-through arrangement according to claim 2, wherein said supporting body includes an oblong receiving section disposed above a circular receiving section.

* * * * *